No. 634,833. Patented Oct. 10, 1899.
S. P. PIERSON.
DRIVING MECHANISM.
(Application filed Jan. 26, 1899.)
(No Model.)
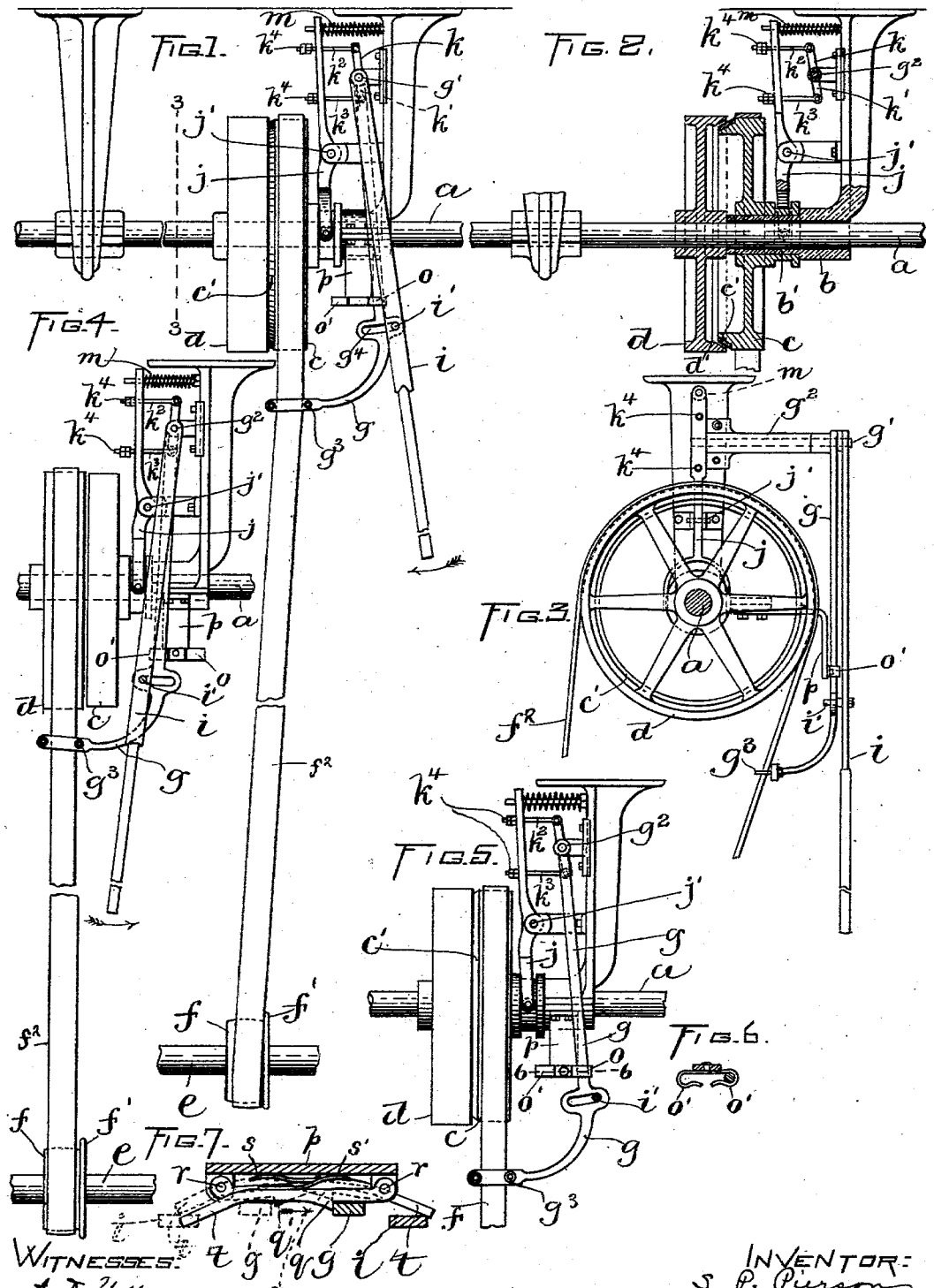

UNITED STATES PATENT OFFICE.

SWAN P. PIERSON, OF EASTON, MASSACHUSETTS.

DRIVING MECHANISM.

SPECIFICATION forming part of Letters Patent No. 634,833, dated October 10, 1899.

Application filed January 26, 1899. Serial No. 703,465. (No model.)

*To all whom it may concern:*

Be it known that I, SWAN P. PIERSON, of Easton, in the county of Bristol and State of Massachusetts, have invented certain new and useful Improvements in Driving Mechanism, of which the following is a specification.

This invention relates to means for transmitting rotary motion from one shaft to another through a driving-belt and a loose pulley, which is mounted independently of the shaft which it surrounds, so that said shaft is relieved from wear resulting from contact with the loose pulley and from the weight or load of the loose pulley, the loose pulley being movable toward and from the fast pulley and provided with a clutch member, so that when moved toward the fast pulley it will be rotated therewith.

The invention has for its object to provide improved means for operating the loose pulley and the belt-shipper; and it consists in the several improvements which I will now proceed to describe and claim.

Of the accompanying drawings, forming a part of this specification, Figure 1 represents a side elevation of a driving mechanism embodying my invention. Fig. 2 represents a similar elevation, parts of the mechanism being shown in section. Fig. 3 represents a section on line 3 3 of Fig. 1 and an elevation of the mechanism at the right of said line. Fig. 4 represents a view similar to Fig. 1, showing the belt on the fast pulley. Fig. 5 represents a view similar to Fig. 1, showing the belt on a loose pulley, the belt-operating lever being removed. Fig. 6 represents a section on line 6 6 of Fig. 5.

The same letters of reference indicate the same parts in all the figures.

In the drawings, $a$ represents the driving-shaft, journaled in suitable hangers, one of which, the hanger $b$, is constructed with a tubular extension $b'$, which serves as a pulley-support to permit the rotation, as well as the lateral movement, of a loose pulley $c$ without permitting said loose pulley to bear on the shaft.

$d$ is the driving-pulley, which is fast upon the shaft $a$ and is located in close proximity to the loose pulley $c$.

$e$ represents the driven shaft, and $f$ a pulley affixed thereto and engaged with the driving-belt $f^2$, which runs either on the fast pulley $d$, as shown in Fig. 4, or on the loose pulley $c$, as shown in Figs. 1, 2, and 5. The pulley $f$ is in line with the driving-pulley $d$ and has a flange $f'$, arranged to retain the belt in place when the belt is transferred to the loose pulley $c$, which is out of line with the pulley $f$.

$g$ represents a shipper, which is an arm hung loosely at its upper end on a support $g'$, hereinafter referred to as a "rock-shaft," and journaled in a bearing $g^2$ on the hanger $b$. The lower end of the shipper is engaged with the belt, so that it can move the latter edgewise, the shipper being shown as provided with a loop $g^3$ embracing the belt. When the shipper is in the position shown in Figs. 1 and 5, it holds the belt on the loose pulley $c$, and when moved to the position shown in Fig. 4 it transfers the belt to the fast pulley $d$.

The shipper $g$ may be operated by any suitable means, such as the lever $i$, which is attached to the rock-shaft $g'$ and is provided with a stud $i'$, which enters a segmental slot $g^4$ in the shipper. The lever $i$ and the rock-shaft $g'$ are also utilized as parts of a mechanism for moving the loose pulley $c$ toward and from the fast pulley $d$, thus causing the engagement of friction-clutch members $c'$ and $d'$, located, respectively, on the pulleys $c$ $d$ when the loose pulley is moved toward the fast pulley, and the separation of said clutch members when the loose pulley is moved in the opposite direction. The object of this engagement of the two pulleys is to cause the rotation of the loose pulley with the fast pulley just before the belt is shipped from one to the other, so that there will be no sudden strain on the belt, as might be the case if the loose pulley were motionless when the belt is being shipped from it onto the moving fast pulley and from the fast pulley back to the loose pulley. The other parts for moving the loose pulley toward and from the fast pulley in this embodiment of my invention are as follows:

$j$ represents a lever which is fulcrumed at $j'$ and is forked at its lower end, the arms of the fork engaging a groove in the hub of the loose pulley.

$k$ $k'$ represent arms affixed to the rock-shaft $g'$ and projecting in opposite directions therefrom.

$k^2$ $k^3$ represent rods pivoted, respectively, to the arms $k$ $k'$ and passing loosely through orifices in the upper arm of the lever $j$, said rods having nuts or enlargements $k^4$ $k^4$, arranged to bear on one side of said lever.

$m$ represents a spring which bears against the upper end of the lever $j$ and normally forces it to the position shown in Figs. 1, 2, and 5, the loose pulley $c$ being thus held separated from the fast pulley $d$.

When the belt is to be shipped from the loose to the fast pulley, the lever $i$ is moved in the direction indicated by the arrow in Fig. 1, this movement turning the rock-shaft $g'$ and causing the arm $k$ and rod $k^2$ to pull the lever $j$ to the position shown in Fig. 4, the lever then engaging the loose pulley with the fast pulley. The slot $g^4$ in the shipper is arranged so that the shipper is not moved by the lever $i$ until the two pulleys have been connected, so that the belt is set in motion by the loose pulley before it is transferred to the fast pulley and strain on the belt is avoided.

When the belt is to be shipped from the fast to the loose pulley, the lever $i$ is moved in the direction of the arrow in Fig. 4, this movement turning the rock-shaft $g'$ in the direction required to cause the arm $k'$ and rod $k^3$ to move the lever $j$, as before, thus throwing the loose pulley into engagement with the fast pulley just before the belt is shipped, so that the loose pulley is rotating when it receives the belt.

The shaft $g^2$, arms $k$ $k'$, and rods $k^2$ $k^3$ constitute a double-acting connection between the levers $i$ and $j$, enabling each movement of the lever $i$ to move the loose pulley into contact with the fast pulley, so that the clutch members are connected before each change of position of the belt.

The slot $g^4$ and stud $i'$ constitute a loose connection between the shipper and the lever $i$, whereby provision is made for operating the shipper by the mechanism which moves the loose pulley toward and from the fast pulley, the said loose connection enabling the shipper to be moved only after the loose pulley has been engaged with the fast pulley.

Means are provided for holding or locking the shipper $g$ in either of the positions shown in Figs. 1 and 4 to prevent liability of accidental displacement of the belt, said means, as shown in Figs. 1, 4, 5, and 6, comprising two spring-clips $o$ $o'$, affixed to an arm or support $p$ and adapted to grasp the shipper and hold it against accidental movement in either of said positions.

In Fig. 7 I show as a substitute for the spring-clips $o$ $o'$ two latches $q$ $q'$, formed on arms which are pivoted at $r$ $r$ to ears formed on the support $p$, said arms being pressed outwardly by springs $s$ $s$ and provided with oblique portions $t$ $t$ at their outer ends, which are held by the springs $s$ $s$ in the path of the lever $i$. When the said lever is at the extreme of its movement, (shown in Fig. 1,) it acts on the incline $t$, connected with the latch $q'$ and forces said latch back from its operative position just before the shipper is moved to transfer the belt to the loose pulley. The latches $q$ $q'$ have beveled faces which permit the shipper to move past each latch, the latch yielding while the shipper is passing and then springing out to engage the shipper. Thus when the lever $i$ has displaced the latch $q'$ and the shipper is moved in the direction indicated by the arrow in Fig. 7 the latch $q$ first yields to the shipper and then springs out, locking the shipper in the position shown in full lines. When the lever $i$ is moved in the opposite direction, it displaces the latch $q$, and thus releases the shipper, which is again locked by the latch $q'$ on reaching the position shown in dotted lines. The latches $q$ $q'$ lock the shipper positively.

I do not limit myself to the details of construction here shown and described and may variously modify and depart from the same without departing from the spirit of my invention. A positive clutch may be employed to connect the pulleys $c$ $d$ instead of a friction-clutch, and any other suitable means may be employed to hold or lock the shipper in its two positions.

It will be seen that the usual loose pulley on the driven shaft is dispensed with, the loose pulley being supported on an independent bearing surrounding the driving-shaft. Heretofore the loose pulley has been mounted on the driven shaft $e$, and the fast pulley on the driving-shaft has been necessarily made of sufficient width to accommodate the belt when on either the fast or the loose pulley of the driven shaft.

Having thus explained the nature of my invention and described a way of constructing and using the same, although without having attempted to set forth all the forms in which it may be embodied or all the modes of its use, I declare that what I claim is—

1. A rotary shaft, a bearing therefor having a pulley-support, a fast pulley on said shaft, a laterally-movable loose pulley on said support beside the fast pulley, clutch members on said pulleys, and loose-pulley-shifting mechanism comprising a pivoted lever engaged with the loose pulley, an operating-lever, and a double-acting connection between the two levers whereby a movement of the operating-lever in either direction is caused to move the loose pulley toward the fast pulley.

2. A rotary shaft, a bearing therefor having a pulley-support, a fast pulley on said shaft, a laterally-movable loose pulley on said support beside the fast pulley, clutch members on said pulleys, loose-pulley-shifting mechanism comprising a pivoted lever engaged with the loose pulley, an operating-lever, and a double-acting connection between the two levers, whereby a movement of the operating-lever in either direction is caused to move the loose pulley toward the fast pulley, and a belt-shipper engaged with the operating-lever and operated thereby.

3. A rotary shaft, a bearing therefor having a pulley-support, a fast pulley on the shaft, a loose pulley journaled on the support and movable toward and from the fast pulley, a belt-shipper adapted to move a belt from one pulley to the other, mechanism for moving the loose pulley toward and from the fast pulley, and a loose connection between said mechanism and the belt-shipper, whereby the latter is operated after the loose pulley has been engaged with the fast pulley.

In testimony whereof I have affixed my signature in presence of two witnesses.

SWAN P. PIERSON.

Witnesses:
    C. F. BROWN,
    A. D. HARRISON.